United States Patent [19]

Poutsma

[11] 3,775,953
[45] Dec. 4, 1973

[54] MACHINE TO SEPARATE PODS OF SIMILAR DISCRETE FRUIT FROM ITS ASSOCIATE VINE OR PLANT

[76] Inventor: Tjeerd J. Poutsma, 11 Nobility St., Via Geelong, Moolap, Victoria, Australia

[22] Filed: Dec. 21, 1971

[21] Appl. No.: 210,501

Related U.S. Application Data

[63] Continuation-in-part of Ser. No. 20,889, March 19, 1970, abandoned.

[30] Foreign Application Priority Data
Mar. 21, 1969 Australia.......................... 52299/69
May 25, 1971 Australia............................ 4983/71

[52] U.S. Cl...................... 56/126, 56/14.6, 56/16.5, 56/331, 209/74 R
[51] Int. Cl...................... A01d 45/22, A01d 45/24
[58] Field of Search................... 56/13.5, 14.6, 16.4, 56/16.5, 126–130, 330–331; 130/30 R; 171/58; 209/74 R, 75, 77, 80, 83, 86, 98, 99

[56] References Cited
UNITED STATES PATENTS
| | | | |
|---|---|---|---|
| 2,788,628 | 4/1957 | Phillips, Jr. | 56/16.5 |
| 1,218,011 | 3/1917 | Spikes | 56/130 |
| 2,943,430 | 7/1960 | Carruthers | 56/14.6 X |
| 2,769,294 | 11/1956 | Goodlad | 56/14.6 |
| 3,347,368 | 10/1967 | Mogensen | 209/99 |

*Primary Examiner*—Louis G. Mancene
*Assistant Examiner*—J. N. Eskovitz
*Attorney*—Leonard W. Sherman et al.

[57] ABSTRACT

Apparatus for separating pods or similar discrete fruit from a vine or plant comprising a grid to support the vine or plant in a distended condition, the openings in the grid being of the size to permit the free passage of the pods or fruit therethrough while the vine or plant is supported on the grid, cutter means to cut the pods or fruit projecting through the grid openings from the vine or plant and means to effect relative movement between the grid and the cutter means to present the pods or fruit to the cutter means.

18 Claims, 11 Drawing Figures

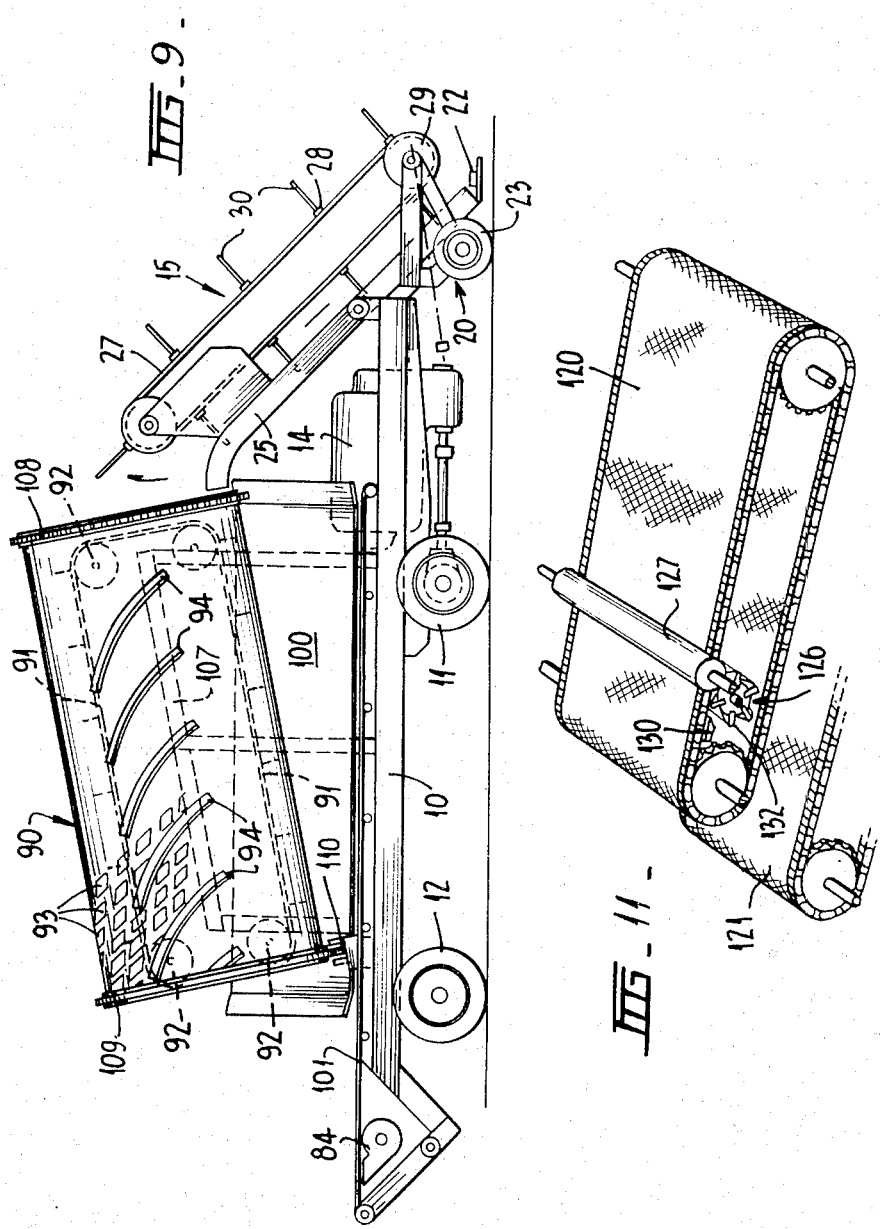

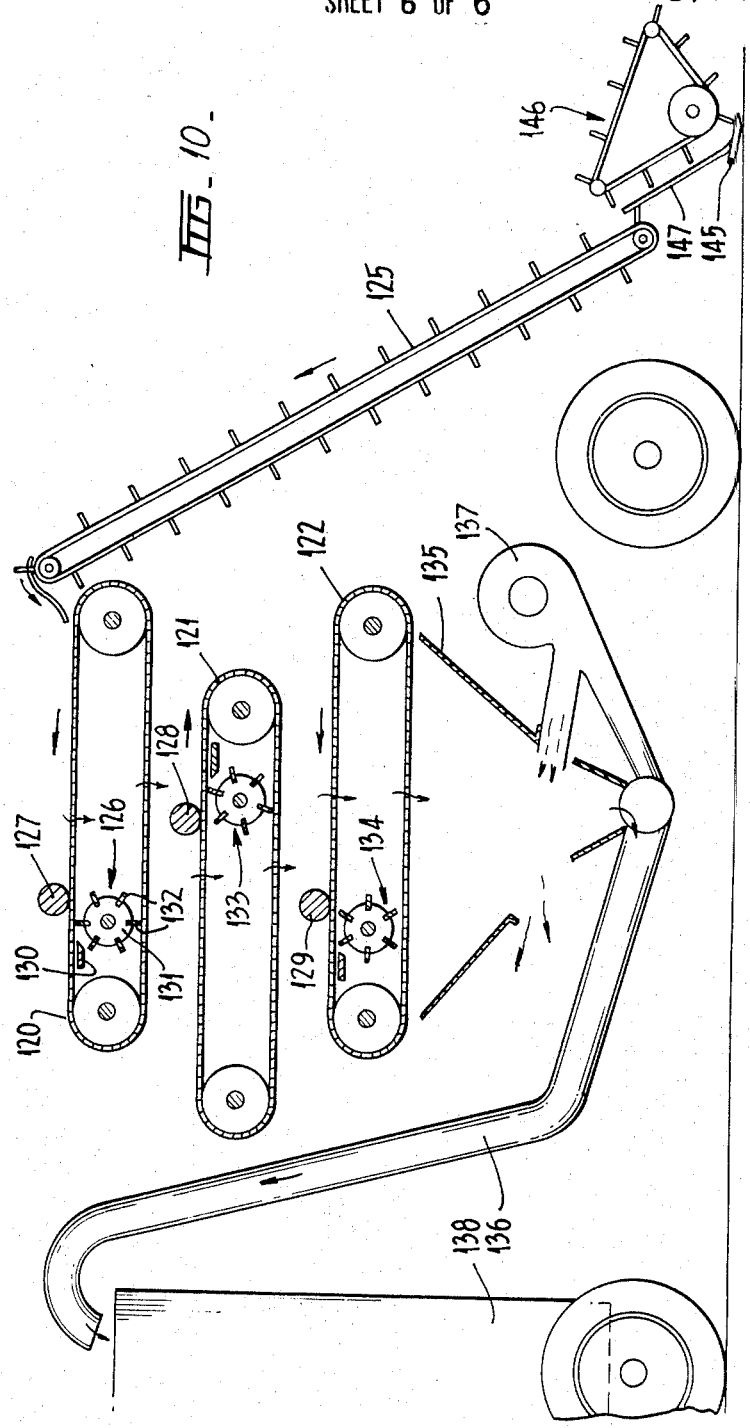

ically quite elaborate, and its
MACHINE TO SEPARATE PODS OF SIMILAR DISCRETE FRUIT FROM ITS ASSOCIATE VINE OR PLANT This application is a continuation-in-part application of my copending application Ser. No. 20,889 filed Mar. 19, 1970, now abandoned.

This invention relates to mechanical harvesting machines for removing pods or similar fruit from a vine or plant, one particular example being pea or bean pods.

Some known machines in this field are used for the separation of the pea pod from the vine when the vine has been gathered from the field, but these known machines are not entirely satisfactory. One of these machines employs a plurality of knives in a chopping action to reduce the pea vine to a series of short lengths, and with the ultimate separation of the heavier pea pod from the trash by a blower or sieve action.

This machine is mechanically quite elaborate, and its chopping action is indiscriminate, with the result that a significant number of pea pods may be chopped into pieces and are thus spoiled.

Another machine, as proposed by Australian Pat. application No. 54785/65, draws the pea vine by means of clawed revolving cogs through slots in an inclined table, while the pods are retained on the top. The vine drawn through is cut into short lengths by knives reciprocating underneath the table. This machine also appears relatively elaborate, and it has not been produced commercially yet.

For the sake of clarity, further revelation of the invention, and its embodiments, will be confirmed to the field of pea pod harvesting from pea vines. It is to be understood, however, that the application of this invention can be extended to the detachment of any similar fruit or pod from its associated plant or vine.

The present invention has for its object the provision of a method to separate pods or similar fruit from a plant or vine where the abovementioned disadvantages are avoided.

With the above stated object in view, there is provided a method of separating pods or similar discrete fruit from a vine or plant comprising distending the vine or plant to expose the pods or fruit, supporting the distended vine or plant on a grid having openings therein of a size to permit the free passage therethrough of pods or fruit suspended from the vine or plant, and cutting the pods or fruit suspended through the grid openings from the vine or plant supported on the grid.

The distending of the vine or plant may be effected by subjecting respective portions of the vine to different rates of movement in a particular path of movement.

Preferably, the distended vine or plant passes successively from one to the next of a plurality of grids and the pods or fruit suspended through the openings of each grid are cut from the vine or plant.

Conveniently pressure may be applied to the vine or plant to promote projection of the pods or fruit through the grid opening.

This invention makes use of the vine and pods' physical characteristics including the one-ended attachment of a pod to the vine, and the relatively greater weight of the harvestable pod, which imparts to the pods a natural tendency to suspend itself from the vine. With the pods in the suspended state they may be readily severed from the vine, while the vine, including stalk, leaf and other material is retained on the grid member and can be mechanically conveyed away as trash.

The distending of the vine or plant expands it from the natural mass of matted plants to a loose more spaced condition. In this condition more pods are exposed and the pods are less entwined in the vine and thus more freely passed through the grid.

There is also provided by the invention apparatus to separate pods or similar discrete fruit from a vine or plant comprising a grid to support the vine or plant in a distended condition, the openings in the grid member being of a size to permit the free passage of the pods or fruit therethrough while the vine or plant is supported on the grid, and cutter means to cut the pods or fruit projecting through the grid opening from the vine or plant.

Means may be provided to distend the vine or plant prior to or during delivery to the grid or means may be provided to effect relative movement between part of the vine or plant relative to the grid while supported on the grid.

Conveniently the cutter means is located beneath the grid, and there is provided means to effect linear movement of the grid in a direction towards the cutter means, and a pressure member extending across the grid in advance of the cutter means to apply pressure to the vines or plants and the grid to steady the latter during cutting of the projecting pods or fruit.

Conveniently the pressure member is a roller mounted to extend transversely across the grid thereabove, and is rotated about its axis by the movement of the vine or plant mass on the grid member. However if desired the roller may be driven independently of the grid member movement.

In addition to holding the grid member steady as it approaches the cutting means to maintain the correct cutting relation between the grid and the cutting means, the pressure member promotes the projection of the pods or fruit through the grid.

Preferably the grid may be in the form of an endless band supported on spaced horizontal shafts so that the vines or plants are delivered to the top flight of the band with the pressure member co-operating with that flight. The cutting means may be disposed between the top and bottom flights of the band at a location downstream with respect to the pressure member to sever the downwardly projecting pods or fruit.

Several grids with respective pressure members and cutting means may be provided in a tiered relationship so that one grid discharges the vine or plant mass to the next grid, the vine or plant mass being progressively stripped of all pods or fruit.

The cutting means may take the form of a fixed cutting blade which co-operates with the lower surface of the grid member to sever any material projecting through the grid openings. Alternatively, the cutting means may comprise a travelling band having a plurality of cutting teeth which moves transversely across the underside of the grid. Preferably a slotted comb is provided between the grid and the band to co-operate with the latter in a scissors cutting action. Yet another form of cutting means comprises a fixed ledger plate below the grid and a co-operating rotating cutting cage having a plurality of peripheral helical cutting blades.

Preferably means are provided to vibrate the grid to promote the projection of the fruit and pods through the openings therein. The vibrating means conveniently act upon the portion of the grid in advance of the pressure member so that the portion of the grid associated with the severing means is not subject to vibration during the cutting action. The pressure applied to the grid by the pressure member effects the damping of vibration in the portion of the grid associated with the cutting means.

It has been found that for harvesting peas the mesh preferably has diamond shaped openings of an area of approximately 30 to 40 sq. ins. in area and a pitch of approximately 9 inches. However, other forms of mesh may be used for peas and for other crops.

The distending or spreading of the vines may be achieved by drawing the vines by a spiked conveyor of the like over a stationary grid. In this construction the opening in the grid may be diamond shaped and may include the V-shaped notch at the forward apex. The V-shaped notch preferably has an included angle within the range 10° to 25° and a maximum width within the range 0.25 and 0.35 inches.

The grid member may comprise two sets of parallel members with the members of one set disposed crosswise with respect to the other set to define a lattice grid, said members being connected at the points of intersection for pivotal movement about axes perpendicular to the plane of the grid member, and the detachment means may comprise means to effect said pivotal movement to sever from the vines or plants pods suspended through said openings.

In another embodiment the grid member may be in the form of the cylindrical wall of a drum into which the vines or plants are received, said drum being mounted for rotation about its axis, and the detachment means comprised a plurality of helical knife members co-operating with the cylindrical wall of the drum.

In a preferred embodiment of the pod harvester the plants in the standing crop are cut with a reciprocating type of cutter bar. The cut plants are carried to a pod separator section of the machine by an elevator including spikes travelling over a smooth base-plate. This base-plate is interrupted by transverse slots which allow any stones or clods present to separate and fall down, without impeding the upward movement of the vine.

The plants are fed onto a spiked drum revolving at a speed considerably faster than that of the elevator. This has the effect of "combing" or opening up the tangled or mass of plant reaching the drum from the elevator, and assists to present a single layer of expanded plants to the grid member.

The plants are delivered to a grid member, forming portion of the pod separator, with suitably sized diamond shaped openings, allowing filled pods, and some of plant material to hang down therethrough, while supporting the stems and the remainder of the foliage.

The plants are dragged over the grid by spikes mounted in an overhead conveyor. At the same time endless chains carry a number of suitably spaced knives over the upper surface of the grid. Any pods and plant parts hanging down into an opening in the grid are arrested in their progress in the forward apex of the openings until cut from the rest of the vine by one of the travelling knives. The severed pods and plant parts fall down through the grid, while the rest of the plant is dragged further along over the grid for the process to be repeated with the remaining pods over other openings. This process is helped by metal strips running between the spikes of the overhead conveyor, and which press the plant down close to the surface of the lattice.

The severed pods and plant parts fall down through the grid onto a wire mesh, with openings large enough to allow single pods and smaller plant parts to fall through, while retaining pods still attached to varying lengths of vine, and larger plant parts. The mesh is arranged in an endless belt and extends beyond the rear extemity of the lattice. The wire mesh conveyor is agitated to facilitate the clearing of material which will pass through, as well as to promote the hanging down of pods retained on the mesh surface by attached plant parts. The suspended pods and other plant parts are cut off by a reciprocating cutter mounted below the mesh. Plant material remaining on the mesh surface after passing over the cutter is removed with the help of air blast and a counter rotating brush.

All the pods and smaller plant parts from both the grid and the mesh conveyor are collected on a sloping plate below the mesh conveyor. The plate is vibrated to transfer the material onto a conveyor belt running along the lower edge of the plate.

The conveyor is made of closely woven wire mesh, allowing the plant fragments and flat pods on it to be removed by air blown through it while retaining filled pods.

The cleaned pods are then transferred to a bin for holding until transport to the factory.

In an alternative construction the elevator delivers the vines directly to a grid in the form of an endless conveyor. The grid operates at a greater speed than the elevator so that the vines are combed or expanded during transfer from the elevator to the grid. The pods projecting through the grid are cut from the vine by a cutting mechanism disposed between the flights of the grid conveyor. The vines are passed to successive grid conveyors each having a cutting mechanism.

The invention will be more readily understood from the following description of one practical arrangement of the pod harvesting machine as illustrated in the accompanying drawings.

Figure 4:
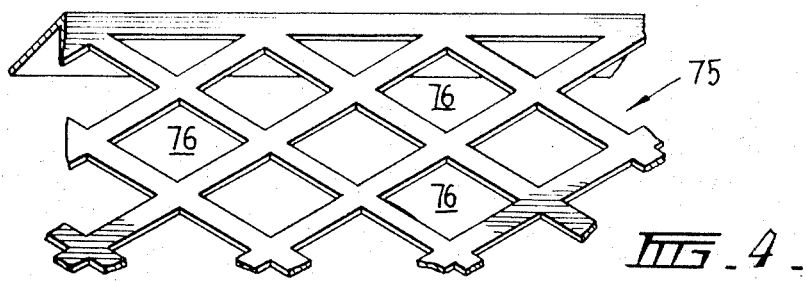
Figure 5:
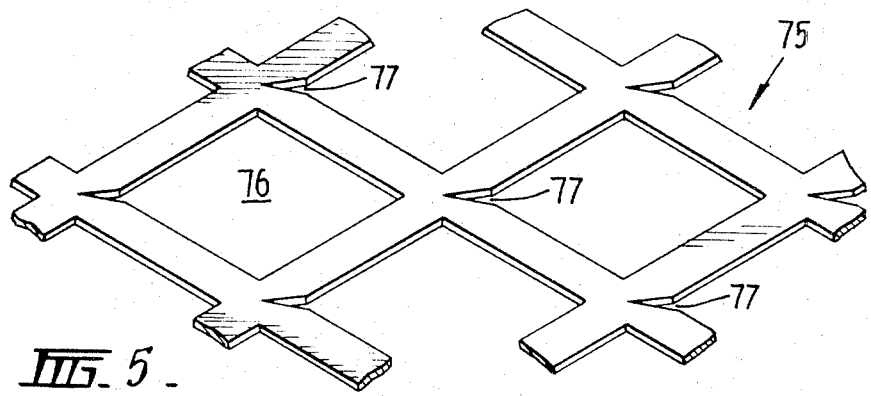
Figure 6:
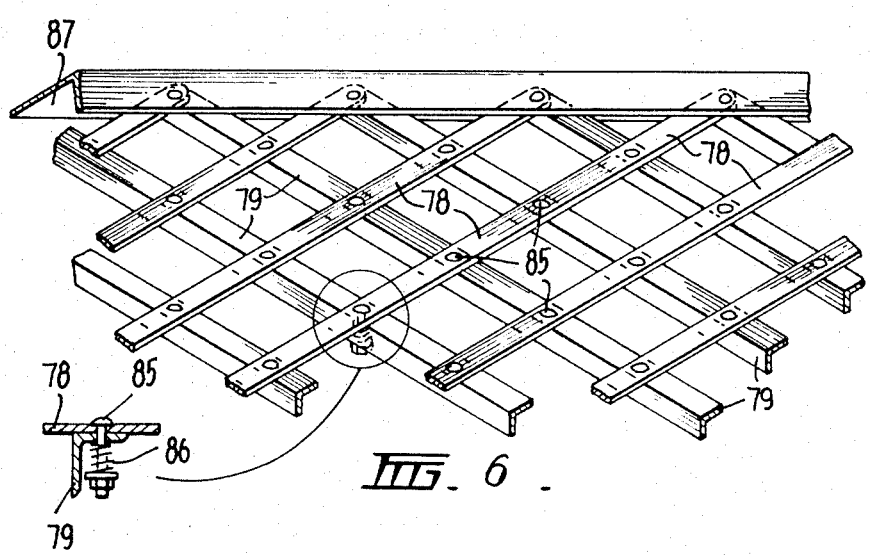
Figure 7:
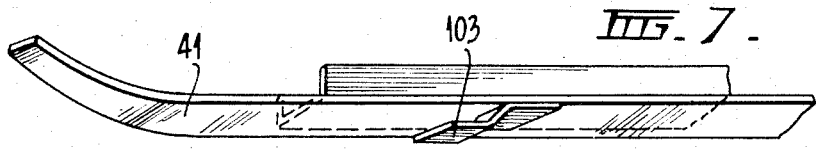

FIGS. 4, 5 and 6 illustrate various forms of the lattice structure which effects initial separation of the pods, FIG. 7 is an enlarged view of the rear portion of one of the pressure members, FIG. 8 is an enlarged view of the transfer portion of the machine, FIG. 9, is a side view of an alternative form of pod separating, FIG. 10 is a diagrammatic representation of an alternative construction of harvester, FIG. 11 is a perspective view of portion of the harvester shown in FIG. 10.

The pod harvesting machine comprises a base-frame 10 supported on front driven wheels 11 and rear steerable wheels 12, and carries the mowing and elevating section 15, and the pod separation section 16. The separated pods are collected on the conveyor 17 for delivery to a rear bind, either mounted upon the machine or drawn thereby, but not shown in the drawings.

Figure 1:
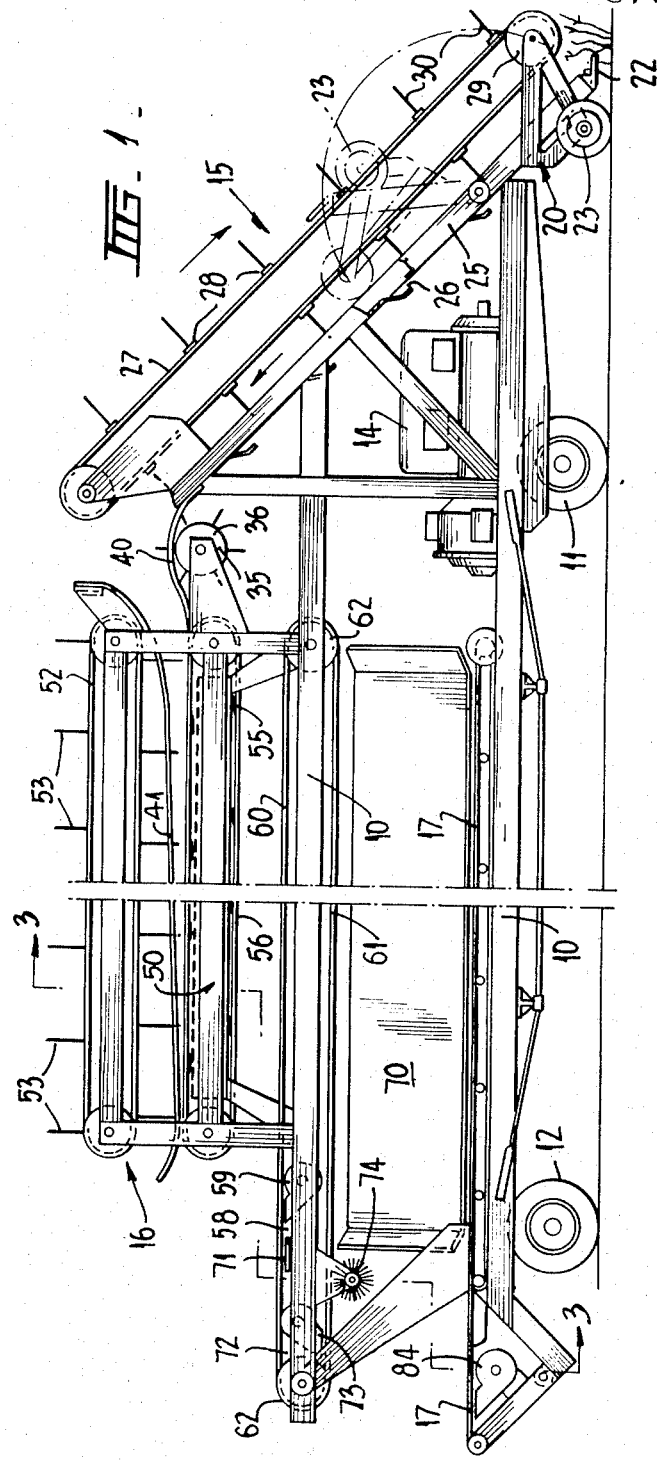
FIG. 1, is a side elevation of the machine.
Figure 2:
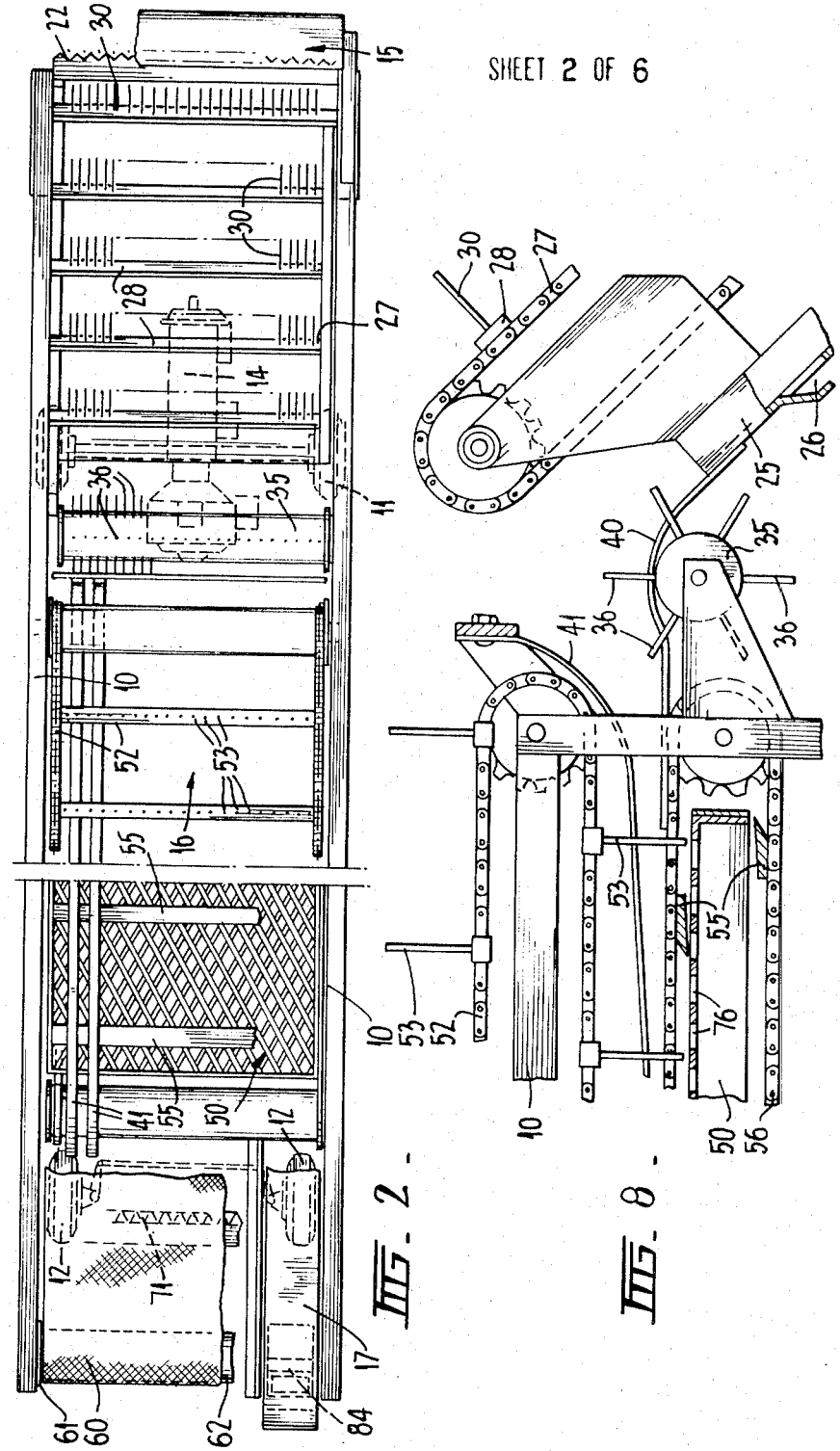
FIG. 2, is a plan of the machine shown in FIG. 1.
Figure 3:
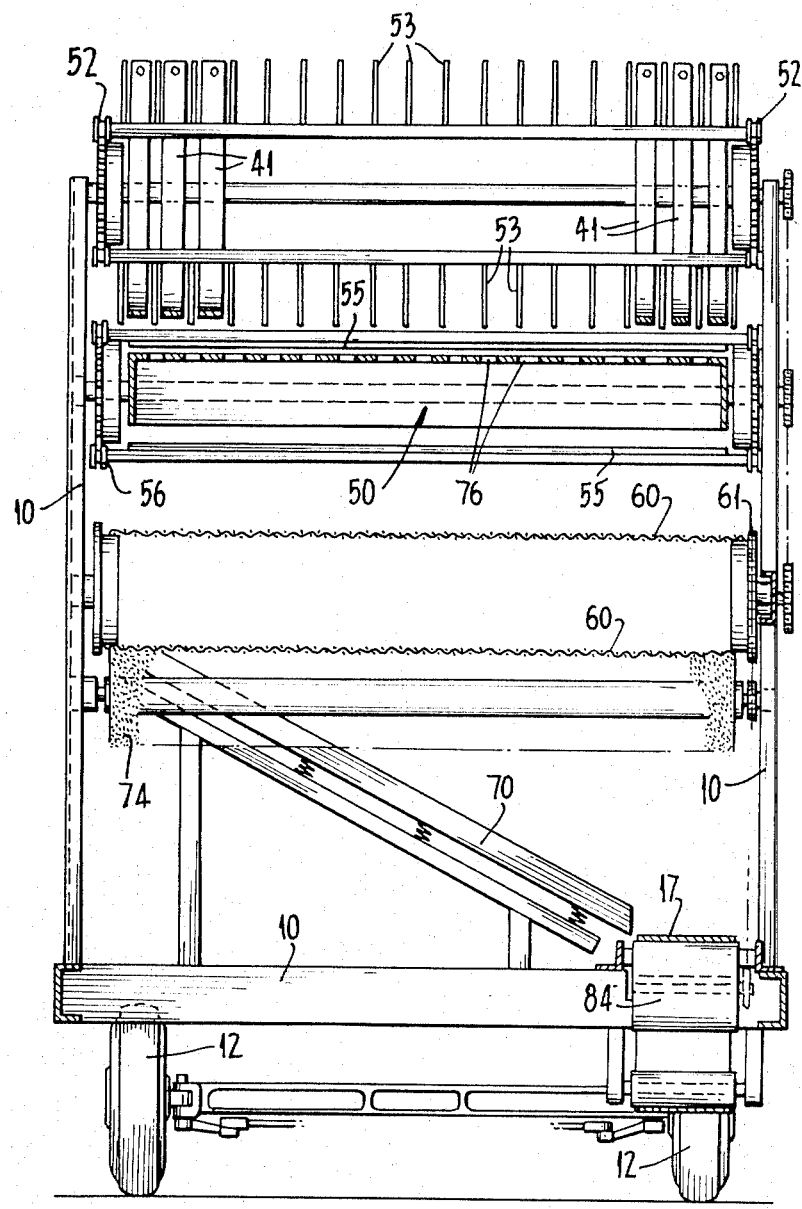
FIG. 3, is a sectional view along line 3—3 in FIG. 1.

The mowing and elevating section 15 is mounted on the forward part of the frame 10, and has a retractable portion 20 which may be raised as shown in FIG. 1 during transport of the machine. The mower mechanism 22 is of the conventional reciprocating sickle type which is driven by suitable means from the engine 14. The height of the retractable portion 20, including the mower mechanism 22, above the ground is controlled by raising or lowering the wheels 23, by an hydraulic cylinder (not shown).

Extending upwardly and rearwardly from the mower mechanism 22, is a shallow conveyor trough 25 having a number of transverse openings 26. Disposed above the conveyor trough is an endless conveyor mechanism comprising a pair of spaced chains 27 with a plurality of parallel bars 28 extending therebetween, each bar carrying a number of spikes 30. The conveyor travels in a clockwise direction as viewed in FIG. 1, and as the bars carrying the spikes travel an arcuate path around the lower chain sprockets 29 the spikes engage the vines as the machine advances and delivers them to the mower mechanism 22 and then carries the severed vine up the conveyor channel 25. During the movement of the vine up the channel, any loose dirt or stones are discharged through the transverse opening 26 in the base of the channel.

The lower sprocket 29 of the elevating conveyor is so positioned over the mower 22, and the radius of the sprockets related in such a manner to the length of the spikes 30 that the spikes in travelling around the lower sprocket 29 accelerate the vines towards and over the mower mechanism 22.

The vines are delivered from the upper end of the conveyor trough onto the carding drum 35 carrying a plurality of spikes 36. The carding drum is driven from the engine at a speed greater than that of an elevator. The vines are delivered by the elevator in the form of a loose mat, and the greater speed of the carding drum 35 has the effect of separating the vines into single plants, or at least of spreading them into a thinner layer before delivery to the pod separator.

Because of the speed, and the spreading action of the carding drum, some portions of the vines may tend to remain on the spikes 36 and not be discharged to the pod separator, whilst other portions may tend to be thrown upwardly by the comparatively high peripheral speed at the outer end of the spikes of the carding drum. Accordingly transfer strips 40 mounted on the upper end of the elevator extend between the rows of spikes on the carding drum to the pod separator. Any portions of the vines which tend to become attached to the spikes 36 are withdrawn therefrom as the spikes move rearwardly and downwardly between the transfer strips 40. In addition, deflector strips 41 are suspended from an upper portion of the frame, to direct any vine portions thrown upwardly by the carding drum, back downwardly into the pod separator.

The pod separator comprises a fixed lattice grid 50, and a woven mesh conveyor 60 below it. The vines received from the carding drum 35 are moved rearwardly over the lattice grid 50 by the overhead spiked conveyor 52 having a plurality of transverse rows of spikes 53 similar to the spike arrangements on the elevator. The deflector strips 41 extend rearwardly between the spikes 53 over the full length of the lattice grid 50, and are stiffened at least over the forward part of the lattice to apply pressure to the vines. The strips 41 control the height of the vines over the lattice grid, and in the rear portion serve to press the vine down into the openings of the lattice.

A plurality of travelling cutter bars 55 extend between endless chains 56 on either side of the lattice grid 50, and are drawn rearwardly over the lattice grid by the chains, and are returned beneath the lattice grid. The cutter bars and chains are arranged so that the cutter bars slide across the top face of the lattice grid in a cutting action, and return therebeneath spaced from the grid, so that there is no cutting action therebetween.

As the thin layer of vines is drawn rearwardly by the overhead spiked conveyor 52 over the lattice grid, the heavier pods becomes suspended from the vine through the openings in the lattice grid, and are either severed by contact with the edges of the openings as the vines are moved rearwardly, or by the action of the cutter bars moving over the lattice grid.

As the vines are in the form of a comparatively thin layer, the movement thereof over the lattice grid by the overhead spiked conveyor 52 and the pressure applied to them by the deflector strips 41, result in the majority of the pods on the vine and a considerable proportion of other plant parts entering one of the openings in the grid at some state during the movement of the vine over the grid, and are thus severed by a cutter bar 55. The remainder of the vine or plant is carried over the rear end of the grid by the overhead conveyor to fall onto the mesh conveyor 60.

The strips 41 are inclined downwardly towards the rear of the lattice grid, and thus perform the dual function of maintaining pressure on the vines as the volume thereof decreases towards the rear end of the grid, and also to clear the vines from the spikes of the overhead conveyor 52 as they reach the end of the lower flight of the conveyor. As shown in FIG. 7, pressure lugs 103 may be provided on the underside of the pressure strips positioned directly above openings in the lattice grid so as to apply local pressure to push the vine into the opening. The pressure lugs 103 have a downwardly and rearwardly inclined forward surface so that they ride up on the travelling cutter bars 55, to permit the bars to pass beneath the lugs. This vertical movement of the lugs is of course transmitted to the deflector strips 41 and thus applies a slight shaking action to the vine to assist in the suspension of the pods through the openings in the grid.

The pods and parts of the vine severed by the cutter bar are collected upon the mesh conveyor 60 positioned directly below the lattice grid. The mesh conveyor conveniently comprises a woven wire endless belt secured along either edge to respective endless chains 61, which pass around driving and idler sprockets 62 at either end of the conveyor. The openings in the woven wire mesh are preferably of a diamond or square shape and are smaller than the openings in the lattice grid. The openings in the woven wire are sufficient to allow individual pods (and smaller plant fragments) to freely pass through both the upper and lower flights of the conveyor, but will not permit the passage of larger sections of vine, or of pods with sections of vine still attached to them. Preferably the upper and lower flights of each chain of the conveyor pass along a ribbed guide surface which undulates in the vertical direction so as to provide an agitation to both flights of the conveyor to assist in the separation of loose pods from the vine material, and also to suspend through the mesh such pods as still remain attached to pieces of vine.

The pods which fall through both the upper and lower flights of the mesh conveyor are caught by the collector plate 70 and delivered to the collection conveyor 17.

An air chamber 58 is disposed between the flights of the mesh conveyor 60 so as to deliver a stream of air upwardly through the top flight from the blower 59. The velocity of the stream of air is selected so that the leafy and light vine material will be blown upwardly off the mesh conveyor, and thereby separated from the remaining pods and heavier material, and will subsequently be deposited on the ground. It has been found that an air velocity between 20 and 30 ft./sec. is suitable.

Rearwardly of the air chamber 58 is a sickle type cutter 71, disposed immediately below the upper flight of the mesh conveyor 60, to sever any pods or vine parts which are suspended through the openings in the mesh conveyor. The severed material then falls through the lower flight of the mesh conveyor onto the collector plate 70. A further air-chamber 72 is disposed between the flights of the mesh conveyor rearwardly of the cutter 71 so as to direct a downward airstream through the lower flight adjacent to the rear sprockets. Air is delivered to the air-chamber 72 by the blower 73 for the purpose of clearing from the mesh conveyor, the remaining vine material which has not passed through the mesh or been discharged as the mesh passes around the rear sprockets. Finally the brush 74 is mounted to engage the under-surface of the lower flight of the conveyor 60 and is driven in a direction opposite to the direction of travel of the lower flight. This brush carries out the final cleaning operation of the mesh so that the pods and vine parts that have been passed through the forward part of the upper flight of the mesh conveyor are not prevented from continuing to fall through the lower flight onto the collector plate 70.

The collector plate 70 extends over the full effective length and width of the mesh conveyor 60 to collect all pods that pass through the mesh conveyor. The collector plate is inclined downwardly in the transverse direction towards the collection conveyor 17 which runs along one side of the machine. Normally the movement of the machine and other components thereon provide sufficient vibration to the collector plate to ensure that the pods move freely down to the collection conveyor. However in order to reduce the height of the machine the inclination of the collector plate may be small, and it would then be desirable to provide a vibration device to vibrate the plate to assist in the movement of the pods towards the collection conveyor.

Also the lower end of the collector plate may extend in an inclined direction across the conveyor so as to distribute the pods across the full width of the conveyor.

The collection conveyor 17 is also in the form of an endless mesh belt and a blower 85 is provided at the rear of the top flight to direct a stream of air upwardly therethrough as a final cleaning operation to remove vine or plant part before the pods are delivered to a collection bin. The collection bin may receive the pods directly from the collection conveyor, or the pods may be delivered to a further elevator, which carries them up for discharge into a bin mounted on the rear of the machine or trailing therebehind.

The lattice grid 50 may take a number of forms, one preferred form as shown in FIG. 4 comprising a flat metal sheet or plate 75 which is rigidly supported so as to provide a flat upperface for co-operating with the moving cutting bars in a cutting action. The openings 76 in the lattice grid are of a diamond shape with the major axis of the diamond extending longitudinally of the machine, that is, in the direction of movement of the cutter bars. The longitudinal length of the openings 76 must of course be adequate to allow pods within the normal size range, to freely fall therethrough. Also the angle at the forward apex of the diamond shaped openings 76 must be such that the pods which have fallen completely through the opening will not be again drawn upwardly out of the opening as the vine is moved over the lattice grid by the overhead conveyor, and yet pods which have not fully passed through the opening will not become caught in the opening apex, but will ride up onto the top of the lattice grid to enter a subsequent opening. Experiments have shown that the angle of the apex should not be less than approximately 55°, otherwise pods partly projecting through the aperture will become jammed in the apex and be subsequently sliced by the cutter bar. In addition, experiments have shown that apex angles greater than 70° tend to favour riding up out of the openings of fully suspended pods; tend to hinder the movement of suspended material sideways and forwards towards the apex; and limited the width and the length of the notches mentioned below. Successful results have been obtained with an apex angle of approximately 60°.

In order to improve the operation of the lattice grid so that fully suspended pods are not withdrawn from the apertures and partly suspended pods are cleared therefrom, a notch 77 may be provided in the apex of the diamond shaped opening towards which the pods are drawn by the overhead conveyor, as shown in FIG. 5. The notch 77 has inclined sides with an included angle within the range of 10° to 25°, and a width at the entry end between 0.25 and 0.35 inches. Successful results have been obtained with an included angle of 15° and any entry width of 0.33 inch.

In an alternative form, as shown in FIG. 6, the lattice grid comprises a plurality of parallel flat bar members 78 arranged in a crossed formation upon a plurality of angle iron member 79. The bars and angle iron members are pivoted by loose pins 85 at the intersections. The springs 86 disposed about the pins 85 press the members together at their points of intersection, while allowing the bars to pivot on the pin. The ends of the bar and angle iron members are similarly pivotally connected to respective actuating members 87 at either side of the lattice grid, and these actuating members are coupled to a reciprocating mechanism (not shown). Thus by lateral reciprocating of the actuating members 87, the sets of members 78, 79 pivot one relative to the other in a scissor-type action.

This scissor action is used to sever the pods and vine parts that are suspended through the diamond-shaped openings in the lattice grid and thereby replace the cutter bars previously described. This arrangement also allows the overhead spiked conveyor to be brought closer to the lattice surface, and in this way makes the conveyor more effective in dragging the vines over the latter.

In yet a further alternative construction the lattice grid may be in the form of the cylindrical wall of a revolving drum 90 as shown in FIG. 9, mounted to rotate about an axis which may be either horizontal or rearwardly and downwardly inclined as shown, with the vines being delivered to the forward end. A spiked conveyor 91 of a construction similar to the previously described overhead conveyor, but with the bars curved so that the spikes follow the contour of the drum, is disposed within the drum 90 and travels in a rectangular path defined by the sprockets 92 to draw the vines rearwardly through the drum over the cylindrical wall. The rearward end of drum 90 is rotatably mounted on rollers 110 which engage circular track 109 attached to the periphery of the rearward end of drum 90. The forward end of drum 90 is similarly mounted on rollers (not shown) which engage toothed gear 108 mounted on the periphery of drum 90. Drum 90 is driven by either a chain drive attached to a motor or alternatively by a set of motor driven geared rollers mating with toothed gear 108.

The openings 93 in the cylindrical wall are again of diamond shape and are preferably arranged with the longitudinal axis of the openings inclined upwardly and rearwardly with respect to the longitudinal axis of the drum. The fixed helical shaped knives 94 are mounted externally of the drum on mounting bars 107 attached to the frame 10 to co-operate with the edges of the openings 93 in a cutting action to sever pods and plant parts projecting through the openings, as the drum revolves. The knives are preferably disposed above the plane of the axis of the drum to allow pods not fully projecting through the openings to fall back into the drum before reaching the knives. The openings 93 may be of one of the previously described shapes employed in the flat grid.

The speed of rotation of the drum and the speed of the spiked conveyor are regulated so that the greater component of the movement of the plants is in the direction of the axis of the drum in order to prevent any build-up of vines in the drum.

Preferably, as shown in FIG. 9, the drum delivers the severed pods directly onto a collection plate 100 and a collection conveyor 101 of the same construction as the similar components described with reference to FIG. 1. However a mesh conveyor with associated cutter and blowers as also described with reference to FIG. 1, may be interposed between the drum 90 and the collection plate 100.

The machine as shown in FIG. 9 is generally of a similar construction to that shown in FIG. 1 with a mower mechanism 22 and an elevator, the latter delivering into the upper forward end of the drum 90.

A further alternative construction of the harvesting machine is shown diagrammatically in FIGS. 10 and 11. In this construction the grid member is in the form of an endless conveyor and three such conveyors 120, 121 and 122, are arranged one above the other. The vines are delivered to the upper grid conveyor 120 by the elevator 125, and are moved rearwardly towards the cutter mechanism 126 disposed between the upper and lower flights of the conveyor. The roller 127 extends transversely across the upper flight of the grid conveyor 120, at a location slightly forward of the cutter mechanism 126. The roller 127 is arranged so as to apply downward pressure to the vines on the grid conveyor as the vines are carried beneath the roller by the grid conveyor and thus assist in promoting the projection of the pods through the grid openings.

The cutting mechanism 126 includes a fixed cutter blade 130 which contacts the lower surface of the upper flight of the grid conveyor 120, and the pressure applied by the roller 127 steadies the grid against this fixed cutter blade to improve the cutting action. The cutting mechanism also includes a cutting cage 131 comprising an open frame of generally cylindrical configuration mounted to rotate about its axis, parallel to the forward edge of the cutting blade 130. The cutting cage includes a plurality of peripheral helical cutting blades 132 which co-operate with the fixed cutting blade during rotation of the cage to cut the pods projecting through the grid from the vine. Cutting mechanisms 133 and 134 similar to that described above are provided for the grid conveyor 121 and 122 respectively and likewise pressure rollers 128 and 129 are provided to co-operate with the upper flight of these conveyors.

The pods severed by each of the cutting mechanisms will pass freely through the respective grid conveyors, and thus once severed from the vine, will pass downwardly to be collected by the hopper 135. The vine with some pods still attached is discharged from the rear end of the upper conveyor 120, onto the next lower conveyor 121. The vine is then subjected to the same actions as received on the top conveyor, and further pods will be separated from the vine by the cutting mechanism 133 associated with this conveyor. The operation is repeated a third time by the discharge of the vines from conveyor 121 to conveyor 122.

The action of transferring the vines from one conveyor to another results in the vine taking up a different orientation on the next conveyor to that it occupied on the conveyor it is being discharged from, and this promotes the exposure of pods so that they may project through the grid openings for subsequent cutting of the vine.

After the vine has traversed the conveyors, it is discharged from the rear of the lowermost conveyor 122 onto the ground. The severed pods and sundry pieces of vine which may also have been severed by the various cutting mechanisms, are collected in the hopper 135 and are discharged therefrom to the pneumatic conveyor 136. An air-blast is directed by the blower 137 through the material passing from the hopper 135 to the pneumatic conveyor 136 so that the lightweight leafy and vine material is separated from the pods and discharged on the ground. The pneumatic conveyor delivers the pods to a bin 138 mounted on the rear of the machine.

The mower assembly 145 is mounted on the forward portion of the harvester, and severs the complete vine from its roots at approximately ground level as the harvester advances. The vine conveyor assembly 146 comprises a plurality of spikes projecting from an endless member and is driven so as to feed the plants towards the mower assembly 145, and to then carry the severed plants up the guide plate 147 to the elevator 125. The vine conveyor is operated so that the spikes engaging the vine as it moves towards the mower at a speed greater than the speed of advance of the harvester so that the vine is pulled by the spikes towards the mower. In addition, the spiked elevation is operating at a speed greater than the vine conveyor, and the upper grid conveyor 120 is travelling a greater speed than the elevator 125. These speed increases between the successive components which handle the vines provide a combing effect which distends or spreads the vines from the initially heavily matted condition existing in the field to a spread and open condition on the top conveyor grid 120. With the vine in this condition, the pods are exposed and may more freely take up a suspended condition projecting through the openings in the grid.

It will of course be appreciated that in addition to the pods other portions of the vine may project through the grid openings and be severed by the cutting mechanisms, but due to the low density of this material, it may be readily separated from the pods by an air blast as previously referred to. In order to remove some of this material, the grid on the lowermost conveyor 122 may be of a finer mesh than the upper two grids. For example, when harvesting peas, the openings in the grid of the upper two conveyors may be 30 to 40 sq.ins. on a 9 inch pitch and the openings in the lower conveyor may be 20 sq.ins. on either a 6 inch or 9 inch pitch.

The projection of the pods through the mesh may be assisted by subjecting the upper flight to a vibratory movement during at least portion of its travel. This vibratory movement may be induced by providing irregularities in the surface of the track supporting the conveyor. Where this vibratory movement is employed, the pressure rollers 127 steady the conveyor as it approaches the cutting mechanism as a result of the pressure applied to the conveyor by the roller through the vines.

I claim:

1. Apparatus to separate pods or similar discrete fruit from a vine or plant comprising a grid to support the vine or plant in a distended condition, the openings in the grid being of a size to permit the free passage of the pods or fruit therethrough while the vine or plant is supported on the grid, cutter means to cut the pods or fruit projecting through the grid openings from the vine or plant and means to effect relative movement between the grid and the cutter means to present the pods or fruit to the cutter means.

2. Apparatus as claimed in claim 1 including means to distend the vine or plant prior to delivery to the grid.

3. Apparatus as claimed in claim 1 including means to effect relative movement between the vine or plant and the grid when the vine or plant is supported on the grid to distend the vine or plant prior to cutting the pods or fruit.

4. Apparatus as claimed in claim 1 including means to press the vine or plant against the grid to promote projection of the pods or fruit through the grid openings.

5. Apparatus as claimed in claim 1 wherein said means to effect relative movement moves the grid relative to the cutter means to feed the pods or fruit projecting through the grid to the cutter means.

6. Apparatus as claimed in claim 1 wherein the cutter means is located beneath the grid, and wherein said means to effect relative movement effects linear movement of the grid in a direction towards the cutter means, and a pressure member extends across the grid in advance of the cutter means to apply pressure to the vines or plants and the grid to steady the latter during cutting of the projecting pods or fruit.

7. Apparatus as claimed in claim 5 including a roller mounted to rotate about an axis extending across the grid transverse to the direction of movement of the grid to apply pressure to the vines or plants and the grid to steady the latter during cutting of the projecting pods or fruit.

8. Apparatus as claimed in claim 5 wherein the grid is in the form of a travelling endless member having a generally horizontal upper flight on which the vine or plant is supported, the cutter means being disposed beneath said upper flight.

9. Apparatus as claimed in claim 1 wherein the grid is in the form of the cylindrical wall of a drum into which the vines or plants are received, said drum being mounted for rotation about its axis, and the cutter means comprises a plurality of helical knife members co-operating with the cylindrical wall of the drum.

10. Apparatus as claimed in claim 1 wherein the grid is a flat member with diamond shaped uniformally orientated apertures therein, and the cutter means comprises a plurality of cutter members carried by endless driving members arranged so that the cutter members pass successively in cutting co-operation over the flat grid member in the direction of the longitudinal axis of the diamond shaped apertures.

11. The apparatus of claim 1 including means to distend the vine or plant during delivery to the grid.

12. The apparatus of claim 1 including means to distend the vine or grid prior to and during delivery to the grid.

13. Apparatus to separate pods or similar discrete fruit from a vine or plant comprising a grid to support the vine or plant in a distended condition, the openings in the grid member being of a size to permit the free passage of the pods or fruit therethrough while the vine or plant is supported on the grid, cutter means located beneath the grid, and means to effect linear movement of the grid over the cutter means to cut the pods or fruit projecting through the grid opening from the vine or plant.

14. Apparatus as claimed in claim 13 wherein a roller is mounted to rotate about an axis extending across the grid transverse to the direction of movement of the grid to apply pressure to the vines or plants and the grid to steady the latter during cutting of the projecting pods or fruit.

15. Apparatus as claimed in claim 13 wherein the grid is in the form of a travelling endless member having a generally horizontal upper flight on which the vine or plant is supported, the cutter means being disposed beneath said upper flight.

16. Apparatus as claimed in claim 13 including a pressure member disposed above and extending transversely across the grid to apply pressure to the vine or plant and the grid in advance of the cutter.

17. Apparatus as claimed in claim 15 wherein the vines or plants are delivered to the grid at a location spaced from the cutter by a conveyor, the grid and conveyor being operable at different respective speeds so as to distend the vine or plant during transfer between the conveyor and grid.

18. Apparatus to separate pods or similar fruit from a vine or plant comprising means to distend vines or plants, a plurality of grids disposed in a tiered formation to receive the distended vines or plants on the upper grid, each grid being in the form of a travelling endless member having a generally horizontal upper flight, the arrangement of the grids being such that the vines or plants are passed successively from one grid to the grid immediately below, the openings in each grid being of a size to permit the free passage of pods or fruit therethrough while the vine or plant is supported on the grid, and cutting means disposed below the upper flight of each grid to sever the pods or fruit projecting through the openings in the grid.

* * * * *